United States Patent [19]

Connor

[11] 4,093,245
[45] June 6, 1978

[54] MECHANICAL SEALING MEANS

[75] Inventor: Peter J. Connor, Bethlehem, Pa.

[73] Assignee: Mosser Industries, Inc., Bethlehem, Pa.

[21] Appl. No.: 802,892

[22] Filed: Jun. 2, 1977

[51] Int. Cl.² ............................................. F23L 13/06
[52] U.S. Cl. .......................... 277/237 R; 126/285 A; 251/172
[58] Field of Search ................... 126/285 A; 251/172, 251/327, 328; 277/237 R

[56] References Cited

U.S. PATENT DOCUMENTS

| 2,810,543 | 10/1957 | Bryant | 251/172 |
| 2,889,134 | 6/1959 | Bryant | 251/172 |
| 3,497,177 | 2/1970 | Hulsey | 251/328 |
| 3,504,883 | 4/1970 | Beck | 251/328 |
| 3,996,864 | 12/1976 | Jones | 126/285 A |

Primary Examiner—Robert I. Smith
Attorney, Agent, or Firm—Sutherland, Asbill & Brennan

[57] ABSTRACT

Sealing means for sealing between a moving member and a fixed frame with which the moving member cooperates, said sealing means comprising rigid, elongated, channel means (on either the frame or the moving member), said channel having a back wall and at least one side wall; a rope which is resiliently compressible across its width positioned lengthwise in said channel; and an elongated metal strip having opposing front and rear surfaces, said strip being flexibly attached along the first of its two long edges to a side wall of the channel so as to sandwich the rope between the back wall of the channel and the rear surface of the metal strip, the channel means, rope, and metal strip being positioned such that the complementary part (either the moving member or the frame) can press against the front surface of the metal strip in sealing engagement therewith, urging the strip against the rope, the resilience of the rope providing a pressure counter to that exerted by the complementary part.

32 Claims, 5 Drawing Figures

MECHANICAL SEALING MEANS

This invention is directed to means for effecting a seal between a fixed frame and a moving member, for example between the housing and blade of a guillotine damper.

Mechanical means for effecting fluid tight seals between moving parts are used and required in all types of apparatus. Valves are a prime example. This invention has as its objective to provide mechanical sealing means effective to seal between a fixed frame and a moving member with which the frame cooperates. The sealing means of the invention is especially effective to seal between a flat closure plate and its housing, e.g., between the blade and frame of a guillotine damper or a swivel damper, or between the door and frame of a smokestack cap. The sealing means of the present invention comprises rigid, elongated channel means (on either the frame or the moving member), said channel having a back wall and at least one side wall; a rope which is resiliently compressible across its width positioned lengthwise in said channel; and an elongated metal strip having opposing front and rear surfaces, said strip being flexibly attached along the first of its two long edges to a side wall of the channel so as to sandwich the rope between the back wall of the channel and the rear surface of the metal strip, the channel means, rope, and metal strip being positioned such that the complementary part (either the moving member or the frame) can press against the front surface of the metal strip in sealing engagement therewith, urging the strip against the rope, the resilience of the rope providing a pressure counter to that exerted by the complementary part.

The cost of the resiliently compressible rope used as a biasing means in the device of the present invention can be much less than that of leaf or coil springs. Also, the initial installation is simpler, as is replacement. Yet these cost savings are not at the expense of performance.

Because of the continuity of rope material, the sealing pressure exerted by the resilience of the rope in the present sealing means is uniform throughout its length. To duplicate that feature with, say, coil springs would require close spacing of the springs, with attendant high cost. Alternatively, to use a long spring strip alone, i.e. without a resilient rope backing, requires that the spring strip be fabricated of relatively thick stock to give it adequate stiffness. But the thicker the metal strip, the less able it is to conform to irregularities in the surface seating against it. In the sealing means of the present invention, the elongated metal strip can be relatively thin, and thus conformable to surface irregularities of the complementary part (moving member or frame), because sealing pressure is not solely dependent upon the stiffness of the metal strip.

The rigid channel means in the sealing means of the present invention has at least two walls and provides an unyielding holder for the compressible rope. For example, in cross section the channel can be generally L shaped, V shaped, or U shaped. The channel can be provided by a variety of different means, so long as it will serve as a rigid receptacle for the compressible rope. For example, it can be provided by a Z bar welded or bolted to the edge of the frame or moving member, or it can simply be an inside corner in the frame or moving member. Preferably it will be generally U shaped in cross section, so that the rope will be tightly held by the channel, completely enclosed when the metal strip is positioned across the opening of the U.

The rope can be formed of any resilient material such as wire mesh or an elastomer which will withstand the conditions of use of the apparatus. If, for instance, the apparatus is a damper to be used in ductwork for transporting flue gases from a coal burning power plant, then the rope material should be capable of withstanding temperatures of, say, about 300° to 1000° F. In some applications even higher temperatures, e.g., up to about 1500° F., may be encountered, in which case the rope material should be selected accordingly.

Suitable elastomers for the rope material include, for example, silicone rubber and elastomeric copolymers of vinylidene fluoride and hexafluoropropylene.

Suitable wire mesh includes mesh made of steel or other alloys such as Inconel or Monel.

When wire mesh is used as the rope it is best that it be ensheathed in a braided or woven fabric, to help hold it together.

Ideal rope materials for use in the sealing means of the present invention are "tadpole seals", so-called because in cross section their shape resembles the outline of a frog larva. The flat portion of a tadpole seal provides a means of attachment without deformation of the bulb portion. Usually, such material is composed of a core section and a cover. Suitable examples include asbestos core with braided asbestos cover (for temperatures up to 500° F.), asbestos core with silicone impregnated, braided asbestos cover (for temperatures up to 550° F.), steel mesh core with braided asbestos cover (for temperatures up to 700° F.), stainless steel mesh core with woven glass fiber cover (for temperatures up to 800° F.), stainless steel mesh core with fine weave asbestos cover (for temperatures up to 1000° F.), ceramic fiber core with double braided Inconel cover (for temperatures up to 1800° F.), and ceramic fiber or Inconel mesh core with ceramic woven cover (for temperatures up to 2000° F.).

The elongated (preferably rectangular) metal strip employed in the sealing means of the present invention can be formed of any metallic stock which will provide a surface for seating against the complementary part (moving member or frame) and which will resist corrosion in the environment of use and withstand the temperatures of use. Spring tempered metal is preferred, e.g., shim stock of steel or other alloy. The metal strip should be made of material that is heavy enough to hold up under repeated opening and closing of the seal, yet thin enough, for example about 0.005 to 0.02 inch, to conform to surface irregularities of the complementary part.

Attachment of the metal strip to the channel can be by any means which will permit flexing of the strip with respect to the side wall, by which is meant partial rotation of the strip about a fixed, longitudinal axis, toward and away from the back wall of the channel. An excellent mode of attachment is provided when the strip has a longitudinal bend in it. One of the planes of the bent strip can be attached face-to-face to a side wall of the channel; the bend will provide the axis, or point of flexure, and the other plane of the strip will provide the section that separates the rope from the complementary part (frame or moving member).

Advantageously, the second long edge of the elongated metal strip, i.e., the edge which is opposite the edge attached to the side wall of the channel, is unattached, giving the strip broad freedom of movement in the direction perpendicular to the back wall of the channel. It is often desirable, however, to put a slight longitudinal bend (up to 90°) in the strip, adjacent to the unattached long edge and directed toward the back wall of the channel. One purpose of the bend is to prevent the complementary part (moving member or frame) from catching the unattached edge of the metal strip and possibly deforming the strip or tearing it loose from the channel means. In a guillotine damper, for example, encrustation on the face of the blade could catch the unattached edge of the strip during blade movement, were there not a marginal bend in the strip, away from the blade face, such as described.

The mechanical sealing means of the present invention can be used in a variety of applications, wherever it is desired to effect a seal between a frame and a moving member which cooperates with the frame. The sealing means can be mounted either on the frame or on the moving member. Usually, however, it will be preferred to mount it on the frame.

The device of the present invention is especially useful in a guillotine damper comprised of a blade and a housing having an elongated aperture in its wall to receive the blade and permit sliding movement of the blade between the damper-closed position and the damper-open position. In that apparatus the sealing means of the present invention can be used to seal the aperture against the opposite faces of the blade, by mounting the sealing means on the housing on both long sides of the aperture, for example with the metal strips positioned so that they have unattached long edges pointing in the general direction of blade withdrawal. If desired, the sealing means on each side of the blade aperture can be so arranged that upon complete withdrawal of the blade from the housing the opposed metal strips will be urged against one another in sealing engagement, effectively closing the aperture. To that end, for example, each metal strip can be so formed and attached to the channel means that its rest position locates its unattached long edge at about the middle of the blade aperture. In that manner the opposing strips will automatically come together when the blade is fully withdrawn. In that embodiment the region of contact between the two elongated strips will preferably be flattened, so as to improve sealing.

The present invention will perhaps be better understood by reference to the attached drawings.

Figure 1:
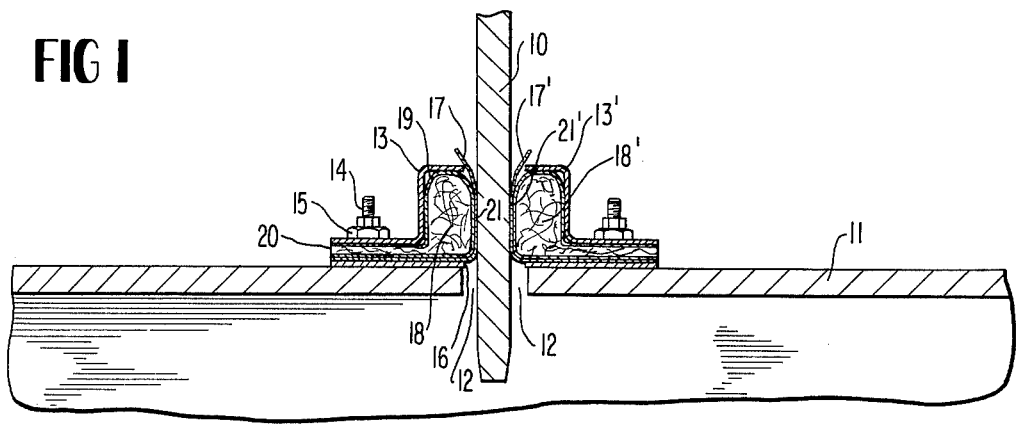
FIG. 1 is an end view in cross-section of the upper portion of a partially open guillotine damper assembly wherein the sealing means of the present invention is mounted to the frame on both sides of the blade withdrawal port.
Figure 5:
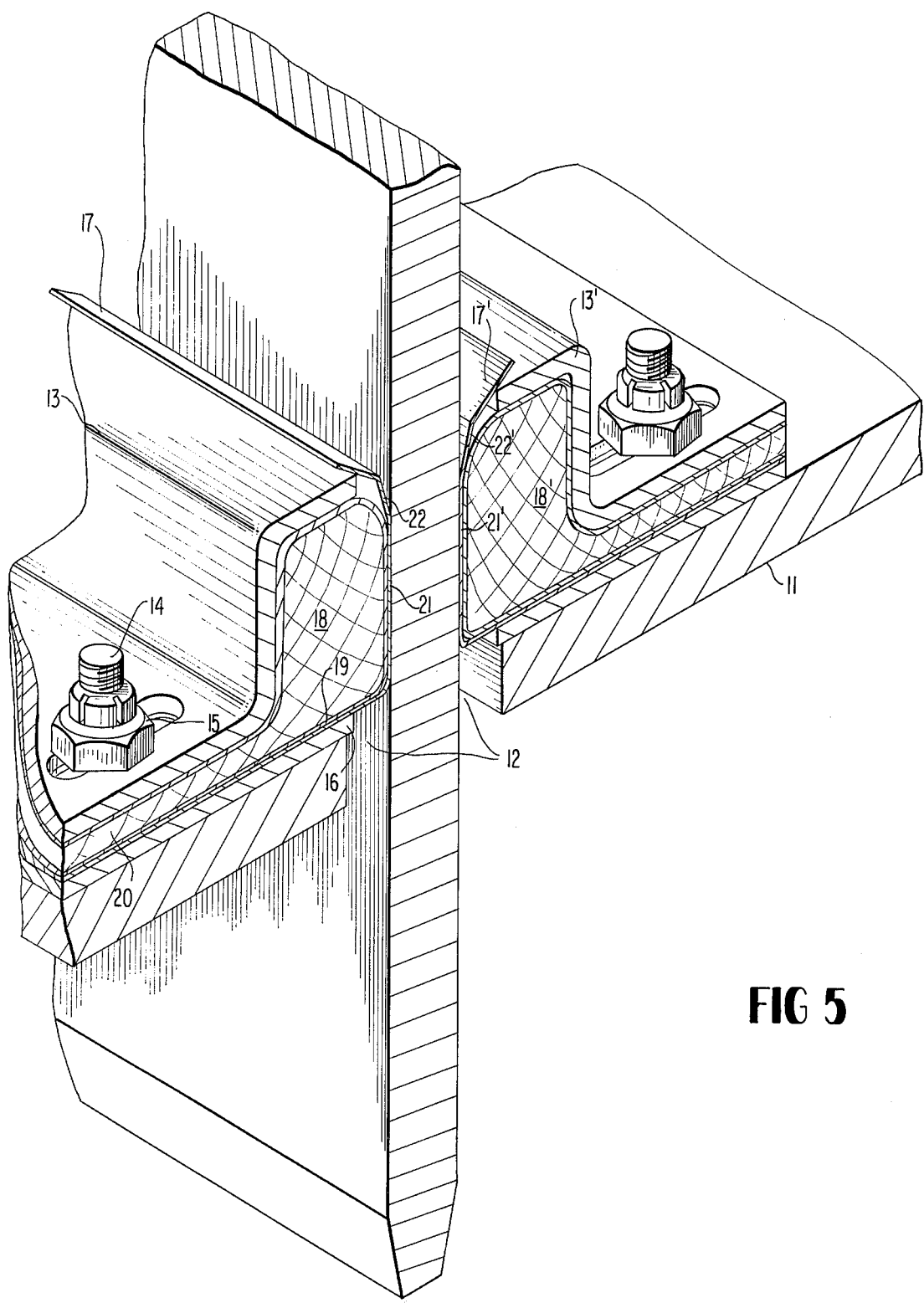
FIG. 5 is an enlarged perspective view in partial cross-section of the guillotine damper assembly illustrated in FIG. 1.

Referring in more detail to FIGS. 1 and 5, blade 10 is shown in a partially withdrawn position from the damper frame 11. Aperture 12 constitutes the withdrawal port for blade 10, which is capable of reciprocal motion in a vertical direction. Referring to the left side of aperture 12, channel means having a generally U shaped cross section are provided by Z bar 13 being mounted on frame 11 by threaded stud 14 and self locking nut 15. The Z bar is fabricated of heavy enough stock that it is rigid, e.g., about 0.075 inch thick.

Held in place by Z bar 13, against frame 11, is wiper blade 16, which is a flat metal rectangle, approximately the same thickness as the Z bar, one of the long edges of which extends part way into the withdrawal port 12. A primary function of wiper blade 16 is to dislodge scale build-up on the face of guillotine blade 10 during opening of the damper. The cross sectional U shape of the channel means is seen in the conformation of Z bar 13 and wiper blade 16 when held together as shown, for example, in FIG. 1, in which instance the U is lying on its right side. The right side of the U is formed of wiper blade 16; the left side is the uppermost horizontal section of the Z bar; and the base of the U is the vertical section of the Z bar.

Positioned lengthwise in the channel just described is a tadpole seal having a stainless steel mesh core 18 with woven glass fiber cover 19. The flat portion 20 of the tadpole seal is held secure under Z bar 13.

Held secure between tadpole seal 20 and wiper blade 16 is spring strip 17, which is a flat, rectangular piece of flexible shim stock, e.g., about 0.01 inch thick, that has been bent into a cross sectional J shape. The base 21 of the J covers the opening of the U shape channel and separates the cover 19 of the tadpole seal from the face of the guillotine blade 10.

On the right side of withdrawal port 12 is mounted the exact same sealing means as on the left side of the port. The Z bars 13 and 13' are positioned close enough to withdrawal port 12 that when guillotine blade 10 protrudes through the port, the bases 21 and 21' of spring strips 17 and 17' are pressed against the opposite faces of guillotine blade 10, in sealing engagement therewith, by the resiliency of the stainless steel mesh cores 18 and 18' of the tadpole seals.

Figure 2:
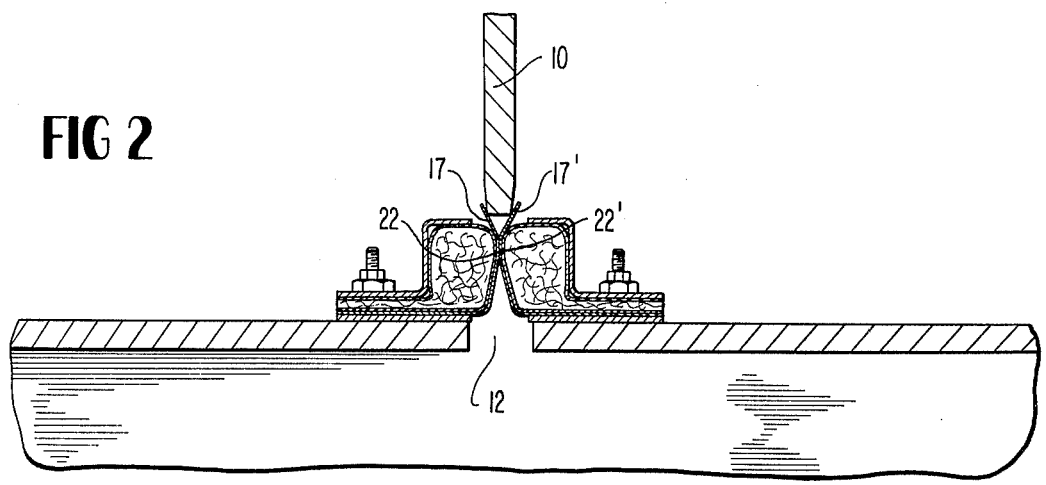
FIG. 2 is an end view in cross-section of the same guillotine assembly portion but with the blade in the fully withdrawn position, i.e., with the damper wide open.

FIG. 2 shows the positions assumed by metal strips 17 and 17' when guillotine blade 10 is completely withdrawn from port 12.

As illustrated, flattened corner portions 22 and 22' come together in sealing engagement, preventing escape of gases through the vacated withdrawal port 12. Each of the two metal strips 17 and 17' preferably has a rest position which urges portions 22 and 22' against one another.

Figure 3:
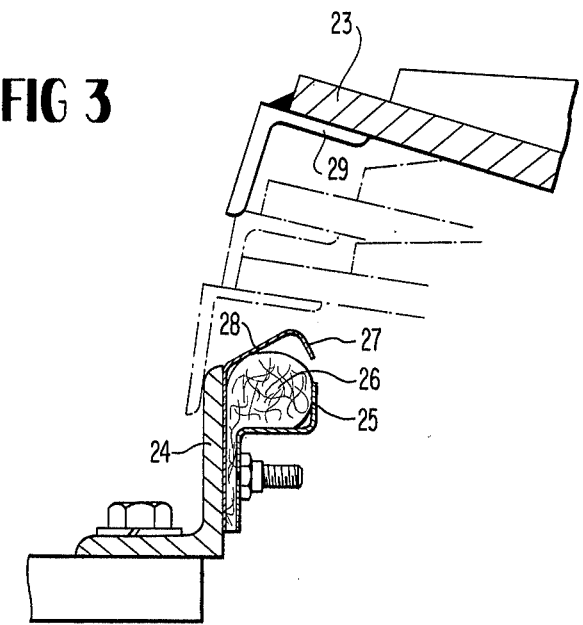
FIG. 3 is a side view in cross-section of a portion of a stack cap assembly utilizing the sealing means of the present invention, with broken lines indicating intermediate cap positions between fully open and fully closed.

FIG. 3 illustrates a stack cap 23 which is hinged to, and closes over, a frame 24. To effect a tighter seal between the cap 23 and the frame 24 in the closed position, Z bar 25 holds tadpole seal 26 and metal strip 27 against frame 24. Metal strip 27 is an elongated rectange which has been bent into a generally J shaped cross section; the base 28 of the J is urged against the underside 29 of the stack cap 23, in sealing engagement therewith, when cap 23 is fully closed. Other means, not shown, are provided for holding cap 23 closed.

Figure 4:
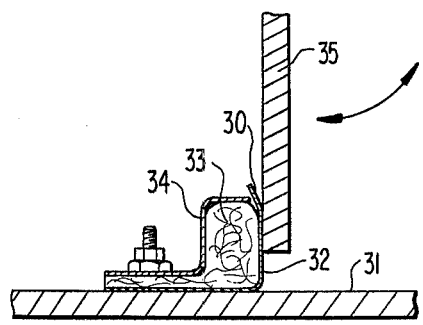
FIG. 4 is an end view of the lower portion of a closed swivel damper assembly wherein the sealing means of the present invention is mounted to the inside wall of the frame adjacent one face of the blade.

FIG. 4 illustrates a swivel damper blade 35 in the closed position, wherein metal strip 30 seals the space between the frame 31 and blade 35. Blade 35 swings to and away from the sealing means, as indicated by the directional arrow. Again, metal strip 30 is generally J shaped in cross section and its base 32 is urged against the face of blade 35 by the resiliency of compressed tadpole seal 33, which is held in place by Z bar 34.

While certain novel features of the invention have been discussed herein and are pointed out in the following claims, it is to be understood that various omissions, substitutions, and changes may be made by those skilled in this art without departing from the essence of the invention.

I claim:

1. Apparatus comprising a moving member, a fixed frame with which the moving member cooperates, and means for sealing between said moving member and said fixed frame, said sealing means comprising means forming a rigid, elongated channel on the frame, said channel having a back wall and at least one side wall; a rope which is resiliently compressible across its width positioned lengthwise in said channel; and an elongated metal strip having opposing front and rear surfaces, said strip being flexibly attached along the first of its two long edges to a side wall of the channel so as to sandwich the rope between the back wall of the channel and the rear surface of the metal strip, said channel means, rope, and metal strip being positioned such that said moving member can press against the front surface of the metal strip in sealing engagement therewith, urging the strip against the rope, the resilience of the rope providing a pressure counter to that exerted by the moving member, said metal strip being thin enough to conform to surface irregularities of the moving member.

2. The apparatus of claim 1 wherein the channel has a generally U shaped cross section.

3. The apparatus of claim 1 wherein the metal strip is spring tempered steel.

4. The apparatus of claim 3 wherein the metal strip is an elongated rectangle which has a longitudinal bend in it, the point of bend being the point of flexibility with respect to the side wall of the channel.

5. The apparatus of claim 4 wherein the second long edge of the metal strip is unattached.

6. The apparatus of claim 1 wherein the moving member is the sliding blade of a guillotine damper and the frame is the damper housing.

7. The apparatus of claim 1 wherein the rope is formed of wire mesh.

8. The apparatus of claim 7 wherein the wire mesh is ensheathed in a woven fabric.

9. Apparatus comprising a moving member, a fixed frame with which the moving member cooperates, and means for sealing between said moving member and said fixed frame, said sealing means comprising means forming a rigid, elongated channel on the frame, said channel having a generally U shaped cross section, the base of the U being the back wall of the channel; a rope which is resiliently compressible across its width positioned lengthwise in said channel; an elongated, rectangular strip made of spring tempered metal and having opposing front and rear surfaces, said strip having a longitudinal bend in it providing flexibility at the point of the bend and being attached along the first of its two long edges to one of the side walls of the channel, so as to sandwich the rope between the back wall of the channel and the rear surface of the metal strip, the second long edge of the strip being unattached; said channel means, rope, and metal strip being positioned such that said moving member can press against the front surface of the metal strip in sealing engagement therewith, urging the strip against the rope, the resilience of the rope providing a pressure counter to that exerted by the moving member, said metal strip being thin enough to conform to surface irregularities of the moving member.

10. The apparatus of claim 9 wherein the rope is formed of wire mesh ensheathed in a woven fabric and the metal strip is made of spring tempered steel.

11. The apparatus for sealing between a moving member and a fixed frame with which the moving member cooperates, said sealing means comprising rigid, elongated channel means on the moving member, said channel having a back wall and at least one side wall; a rope which is resiliently compressible across its width positioned lengthwise in said channel; an elongated metal strip having opposing front and rear surfaces, said strip being flexibly attached along the first of its two long edges to a side wall of the channel and the rear surface of the metal strip, said channel means, rope, and metal strip being positioned such that said frame can press against the front surface of the metal strip in sealing engagement therewith, urging against the rope, the resilience of the rope providing a pressure counter to that exerted by the frame.

12. The apparatus of claim 11 wherein the channel has a generally U shaped cross section.

13. The apparatus of claim 11 wherein the metal strip is spring tempered steel.

14. The apparatus of claim 13 wherein the metal strip is an elongated rectangle which has a longitudinal bend in it, the point of bend being the point of flexibility with respect to the side wall of the channel.

15. The apparatus of claim 14 wherein the second long edge of the metal strip is unattached.

16. The apparatus of claim 11 wherein the rope is formed of wire mesh.

17. The apparatus of claim 16 wherein the wire mesh is ensheathed in a woven fabric.

18. Apparatus comprising a moving member, a fixed frame with which the moving member cooperates, and means for sealing between said moving member and said fixed frame, said sealing means comprising means forming a rigid, elongated channel on the moving member, said channel having a generally U shaped cross section, the base of the U being the back wall of the channel; a rope which is resiliently compressible across its width positioned lengthwise in said channel; an elongated, rectangular strip made of spring tempered metal and having opposing front and rear surfaces, said strip having a longitudinal bend in it providing flexibility at the point of the bend and being attached along the first of its two long edges to one of the side walls of the channel, so as to sandwich the rope between the back wall of the channel and the rear surface of the metal strip, the second long edge of the strip being unattached; said channel means, rope, and metal strip being positioned such that said frame can press against the front surface of the metal strip in sealing engagement therewith, urging the strip against the rope, the resilience of the rope providing a pressure counter to that exerted by the frame, said metal strip being thin enough to conform to surface irregularities of the frame.

19. The apparatus of claim 18 wherein the rope is formed of wire mesh ensheathed in a woven fabric and the metal strip is made of spring tempered steel.

20. A guillotine damper comprising a blade, a housing having an elongated aperture in its wall to receive said blade and permit sliding movement of the blade between damper-closed position and damper-open position and means for sealing the aperture against the opposite faces of the blade, said sealing means comprising means forming a rigid, elongated channel on the housing on each long side of the aperture, each of said channels having a back wall and at least one side wall, said back wall being substantially parallel to the plane of said blade; a rope which is resiliently compressible across its width positioned lengthwise in each of said channels; each long side of the aperture having an elongated metal strip with opposing front and rear surfaces, said strip being flexibly attached along the first of its two long edges to a side wall of the channel so as to sandwich the rope between the back wall of the channel and the rear surface of the metal strip; said channel means, ropes, and metal strips being positioned such that when the blade is inserted through the aperture, each of the blade faces presses against the front surface of one of the metal strips in sealing engagement therewith, urging the strip against the rope, the resilience of the rope providing a pressure counter to that exerted by the blade, said metal strips being thin enough to conform to surface irregularities of the blade faces.

21. The guillotine damper of claim 20 wherein the sealing means are so adapted that upon complete withdrawal of the blade from the housing, the metal strips on the opposing long sides of the aperture are urged against one another in sealing engagement, effectively closing the aperture.

22. The guillotine damper of claim 20 wherein each metal strip's second long edge is unattached and generally points in the direction of blade withdrawal.

23. The guillotine damper of claim 22 wherein each metal strip has a longitudinal bend adjacent to the unattached long edge, the bend being directed away from the blade face, the angle of the bend being no more than 90°.

24. The guillotine damper of claim 11 wherein each channel has a generally U shaped cross section.

25. The guillotine damper of claim 23 wherein the metal strip is made of spring tempered steel about 0.005 to 0.02 inch thick.

26. The guillotine damper of claim 25 wherein each of the metal strips is an elongated rectangle which has a longitudinal bend in it, the point of bend being the point of flexibility with respect to the side wall of the channel.

27. The guillotine damper of claim 25 wherein the rope is formed of wire mesh.

28. The guillotine damper of claim 27 wherein the wire mesh is ensheathed in a woven fabric.

29. A guillotine damper comprising a blade, a housing having an elongated aperture in its wall to receive said blade and permit sliding movement of the blade between damper-closed position and damper-open position, and means for sealing the aperture against the opposite faces of the blade, said sealing means comprising means forming a rigid, elongated channel on the housing on each long side of the aperture, each of said channels having a generally U shaped cross section, the base of the U being substantially parallel to the plane of the blade and constituting the back wall of the channel; a rope which is resiliently compressible across its width positioned lengthwise in each of said channels; each long side of the aperture having an elongated, rectangular strip made of spring tempered metal about 0.005 to 0.02 inch thick and having opposing front and rear surfaces, said strip having a longitudinal bend in it providing flexibility at the point of the bend and being attached along the first of its two long edges to one of the side walls of the channel, so as to sandwich the rope between the back wall of the channel and the rear surface of the metal strip, the second long edge of the strip being unattached and generally pointing in the direction of blade withdrawal, said strip having a longitudinal bend adjacent to the unattached long edge, the bend being directed toward the back wall of the channel, and the angle of the bend being no more than 90°; said channel means, ropes, and metal strips being positioned such that when the blade is inserted through the aperture, each of the blade faces presses against the front surface of one of the metal strips in sealing engagement therewith, urging the strip against the rope, the resilience of the rope providing a pressure counter to that exerted by the blade.

30. The guillotine damper of claim 29 wherein the sealing means are so adapted that upon complete withdrawal of the blade from the housing, the metal strips on the opposing long sides of the aperture are urged against one another in sealing engagement, effectively closing the aperture.

31. The guillotine damper of claim 29 wherein the rope is formed of wire mesh ensheathed in a woven fabric and the metal strip is made of spring tempered steel.

32. The guillotine damper of claim 30 wherein the rope is formed of wire mesh ensheathed in a woven fabric and the metal strip is made of spring tempered steel.

* * * * *